April 12, 1932.　　　J. L. KILCHENSTEIN　　　1,853,769
AUTOMATIC LENGTH ADJUSTER FOR RECIPROCATING POWER TRANSMITTING LINES
Filed Feb. 1, 1929　　3 Sheets-Sheet 1
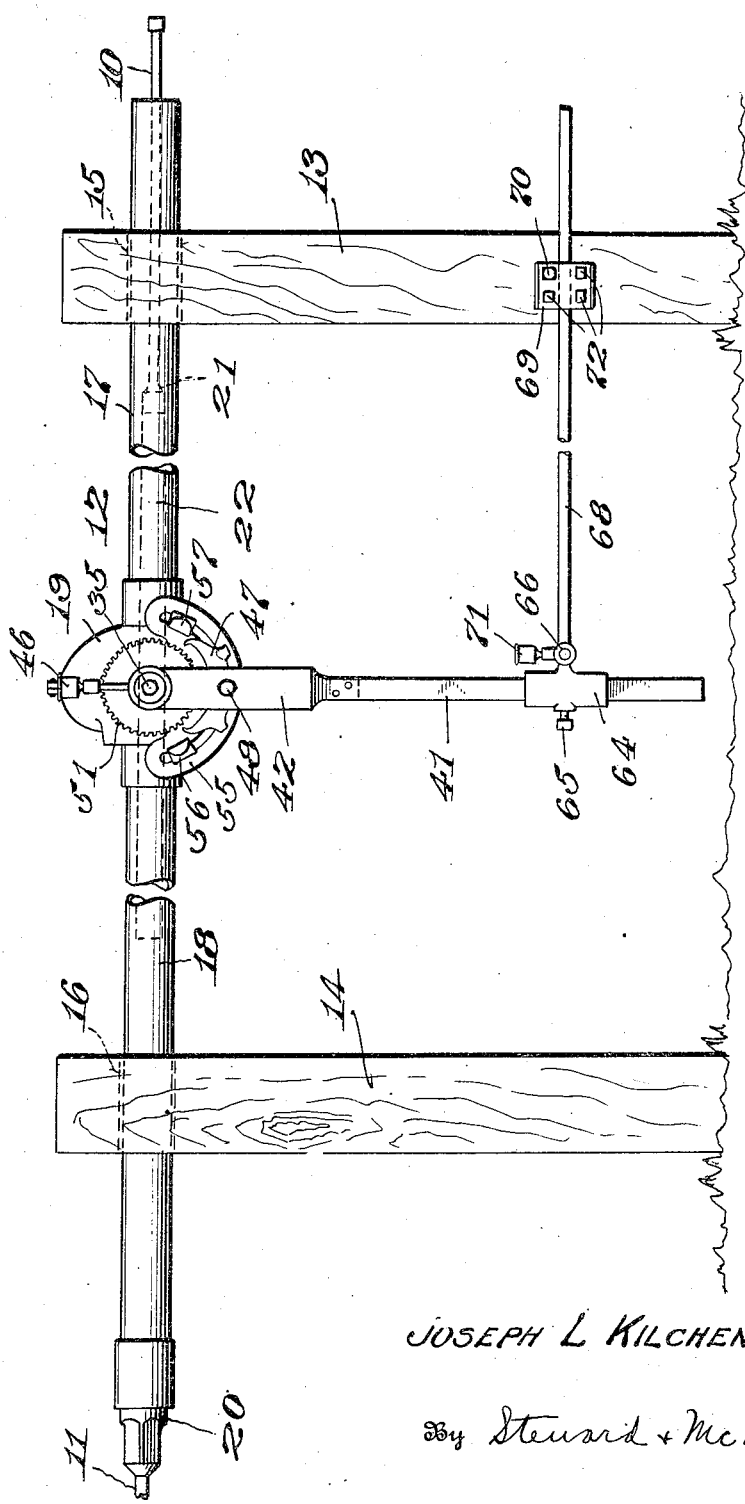
Inventor
JOSEPH L. KILCHENSTEIN,
By Steward + McKay
his Attorneys April 12, 1932. J. L. KILCHENSTEIN 1,853,769
AUTOMATIC LENGTH ADJUSTER FOR RECIPROCATING POWER TRANSMITTING LINES
Filed Feb. 1, 1929 3 Sheets-Sheet 2
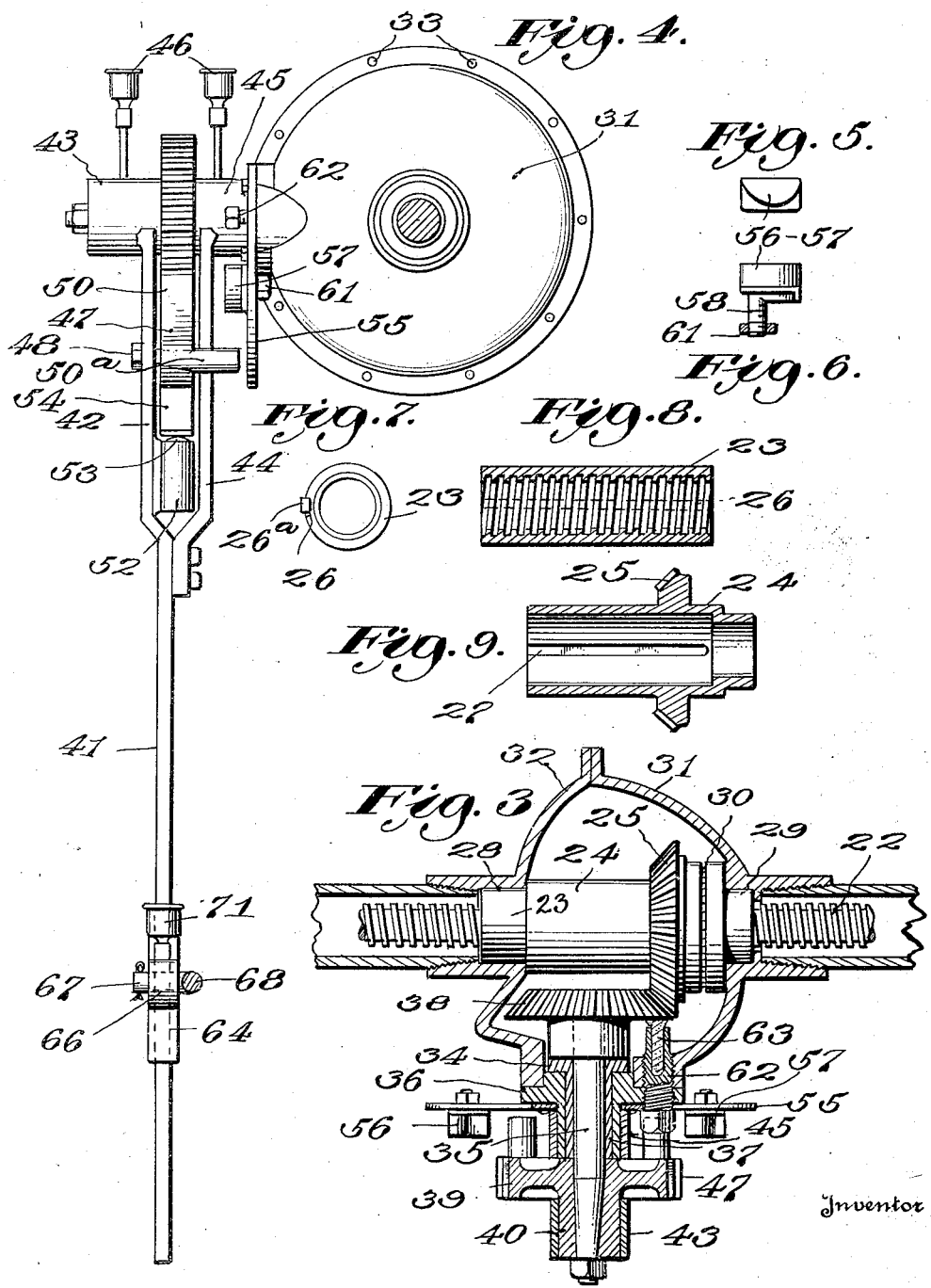
Inventor
JOSEPH L. KILCHENSTEIN,
By Steward & McKay
his Attorneys

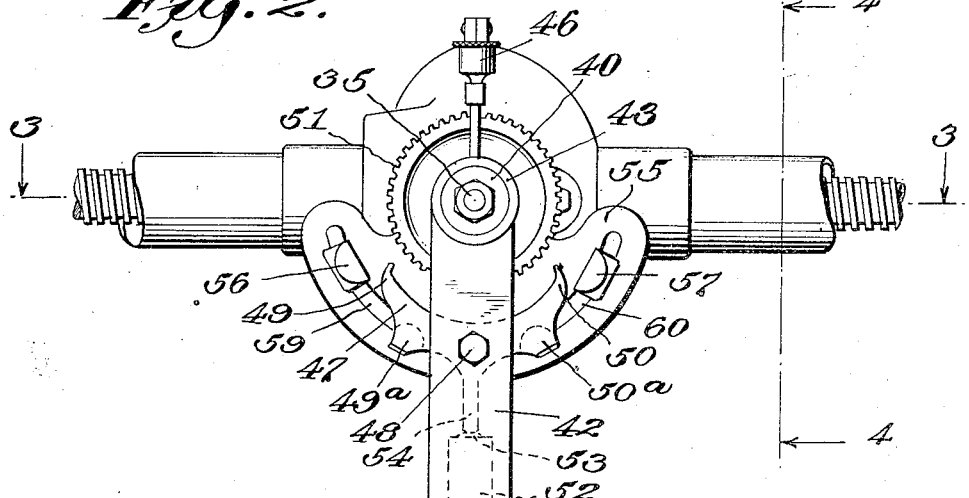
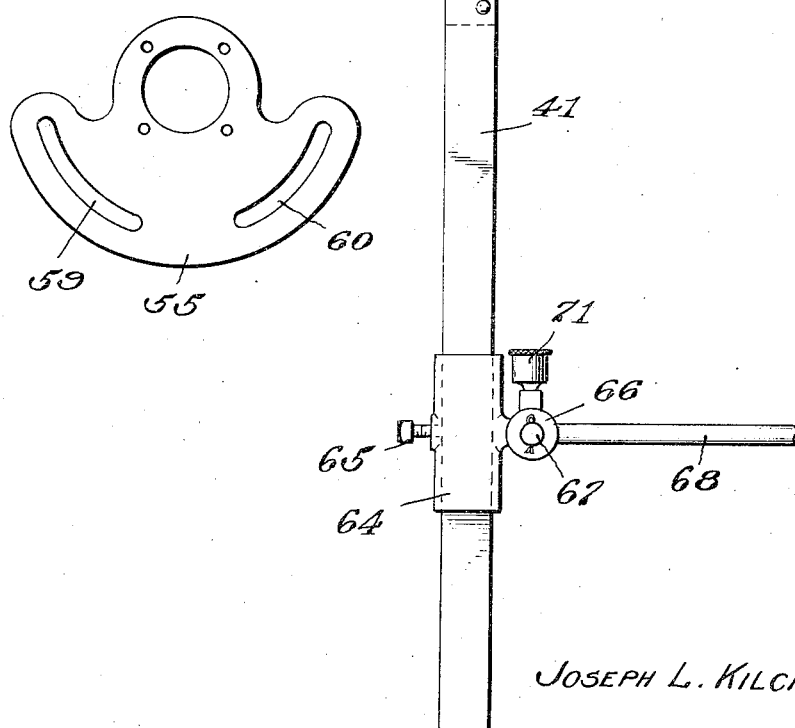

Patented Apr. 12, 1932

1,853,769

UNITED STATES PATENT OFFICE

JOSEPH L. KILCHENSTEIN, OF DALLAS, TEXAS, ASSIGNOR TO MAGNOLIA PETROLEUM COMPANY, OF DALLAS, TEXAS, A CORPORATION OF TEXAS

AUTOMATIC LENGTH ADJUSTER FOR RECIPROCATING POWER TRANSMITTING LINES

Application filed February 1, 1929. Serial No. 336,818.

This invention relates to automatic length adjusters for reciprocating power transmitting lines and particularly to adjusters for reciprocating pull rod lines of oil well pumping systems. In such pumping systems a pull rod line extending from the power plant to the well or number of wells for operating the pump jacks at the wells may be of considerable length. Since the pump jacks should move through uniform strokes at all times it is necessary to compensate for changes in length of the pull rod line due to changes in temperature. If the line were allowed to expand the jack would not be pulled as high as it should be and it would be permitted to fall too low and if the line is contracted the opposite is true,—the jack is pulled too high and is not allowed to fall low enough. According to this invention the length of the rod line is adjusted automatically, so that it will remain the same, or nearly so, under all conditions of temperature and thus shifting of the stroke limits of the line is prevented.

In a practical embodiment of this invention, as applied to a pull-rod line of an oil well pumping system, the length adjusting means comprises a turnbuckle device connecting sections of the rod line and enclosed in a longitudinal housing or carriage which is slidingly carried by suitable fixed supports therefor. The turnbuckle device is operated upon by means of an actuator swingingly carried by the carriage and connected to one of the fixed supports so as to effect a compensating increase or decrease in the length of the rod line. The turnbuckle is provided with a rotatable actuating means extending outside of the carriage which is to be engaged by a pawl member carried by the swinging actuator for rotating said means in one direction or the other according to the manner in which the pawl member is thrown into engagement with said rotatable means as effected by one or the other of a pair of trip members which are mounted on the carriage. One of the trip members comes into operation during the time the rod line is expanding due to an increase in temperature so as to cause the pawl to rotate actuating means of the turnbuckle for decreasing the length of the rod line and the other of said trip members is operable in a similar manner to effect an increase in the length of the rod line when the rod line is contracting due to a decrease in temperature.

Another feature of this adjusting device resides in the facility for quickly adapting it for strokes of different lengths by increasing or decreasing the effective length of the swinging actuator.

A further feature resides in the facility with which the limits of the normal stroke of the adjuster may be shifted along the path of movemnt of the rod line without changing the length of the stroke thereof in the event that such longitudinal shifting should become necessary.

Other objects and novel features and advantages of the invention will become apparent from the following description taken in conjunction with the accompanying drawings which illustrate one practical form of apparatus embodying the invention, it being understood that the description of this specific embodiment is merely illustrative and not restrictive.

Referring to the drawings:

Figure 1 is a side elevation of a rod line adjuster in accordance with this invention showing supporting means for the rod line and adjuster and operating connecting means between the supporting means and adjuster;

Figure 2 is an enlarged side elevation of the rod line adjuster with parts broken away;

Figure 3 is a sectional view taken on line 3—3 of Figure 2;

Figure 4 is a sectional view taken on line 4—4 of Figure 2; and

Figures 5 to 10 inclusive are detail views of some of the parts of the adjuster.

Referring to the drawings, 10 and 11 are sections of a rod line providing a driving connection between a power plant and an oil well pump (not shown), section 10 extending toward the power plant and section 11 toward the pump. The sections are connected by means of a turnbuckle device, generally designated by the numeral 12, constituting a coupling which reciprocates with the rod line and is supported by posts 13 and 14 having apertures 15 and 16 through which tubes 17 and 18 extending in alined opposite directions from a turnbuckle casing 19 are arranged to slide; tubes 17 and 18 and casing 19 constitute a carriage for the turnbuckle device.

Rod line section 11 is connected directly to the outer end of tube 18 as shown at 20 and section 10 is connected as shown at 21 with a long screw 22 of the turnbuckle device which screw extends through the carriage and is slidable longitudinally therein for adjustment of the rod line as will be described hereinafter. A rotatable nut or sleeve 23, preferably made of bronze is threaded on screw 22 so as to turn with respect thereto and is encased in a hub member 24 which is provided with a beveled gear 25. Nut 23 and hub member 24 are provided with longitudinal key ways 26 and 27 whereby they may be secured to each other by means of a key 26ª so that the nut is turned whenever hub member 24 and gear 25 are turned. The ends of these members engage in suitable bearings or sockets 28 and 29 formed in the turnbuckle casing 19 so as to prevent longitudinal movement of screw 22 with respect to the carriage except as effected by the turning of the nut. In order to facilitate the turning of nut 23 thrust ball bearings 30 are positioned at the end of hub member 24 between gear 25 and the turnbuckle casing.

The turnbuckle casing 19 is preferably made in two sections 31 and 32 which may be bolted together or fastened by rivets 33 after the turnbuckle members have been assembled. These sections are formed so that when they are assembled they provide an opening 34 on one side of the casing through which a drive shaft 35 may extend, the opening being closed by a cover member 36 secured to the casing and provided with a bearing 37 for the drive shaft 35. On one end of drive shaft 35, inside the turnbuckle casing, is secured a beveled gear 38 meshing with gear 25 for turning nut 23 and on the other end of the drive shaft, outside the turnbuckle casing is secured a driving ratchet wheel 39 having a hub 40. Obviously the invention is not limited to the type of gearing just described, however, for driving nut 23, as other types of gearing for instance a worm drive, for example, may be used for this purpose.

In order to turn the driving ratchet wheel 39 a ratchet arm 41 is mounted so as to swing with respect thereto by forming the upper part of arm 41 into a yoke, the front side 42 (Fig. 3) of the yoke having bearing 43 at its upper end engaging the hub 40 of ratchet wheel 39 as a journal therefor and the opposite or rear side 44 of the yoke having a corresponding bearing 45 which engages the exterior of bearing 37 as a journal therefor. Bearings 43 and 45 may each be provided with lubricating devices such as grease cups 46. A ratchet pawl 47 is mounted between the sides 42 and 44 of the yoke of the ratchet arm on a pivot member 48. In order that either ratchet tooth, 49 or 50, of pawl 47 may be moved into engagement with the teeth 51 of the ratchet wheel 39 to turn it in one direction or the other the pawl is provided with a pair of rearwardly extending ratchet cams 49ª and 50ª. A tubular housing 52 is secured in the yoke below the ratchet pawl 47 and carries a spring bolt 53 the upper end of which is adapted to engage the lower end of the downward projection 54 of the ratchet pawl 47 to yieldingly hold it in "neutral" position, as shown in Figure 2, and thereby prevent the swinging of the pawl so that neither of the teeth, 49 and 50, of the pawl will engage the ratchet wheel 39 except when positively moved into engagement therewith. A quadrant 55 is secured to the turnbuckle casing 19 and carries a pair of trip members 56 and 57 which cooperate with the ratchet cams 49ª and 50ª of the pawl 47 to move the teeth 49 and 50 of the pawl into engagement with ratchet wheel 39 in the event that the turnbuckle device is moved beyond its normal stroke in one direction or the other. Trip members 56 and 57 are provided with rearwardly extending bolt members 58 which pass through radial slots 59 and 60 in the quadrant 55 and are secured in adjusted positions by nuts 61 threaded thereon and engaging the rear side of the quadrant 55. Slots 59 and 60 permit the ratchet trips to be moved for adjustment of the apparatus for different length strokes of the rod line. A hollow screw 62 (see Fig. 3) is threaded through the turnbuckle casing 19 and carries a piece of fiber or other frictional material providing a brake 63 for engaging the side of gear 38 to prevent it from being turned except when either ratchet pawl tooth, 49 or 50, is moving the ratchet wheel in adjusting operation.

In order to swing the ratchet arm 41 as the rod line is reciprocated a clamp 64 is secured to arm 41 by means of a set screw 65 below the yoke in a position corresponding to the length of the reciprocatory stroke of the rod line as will hereinafter be more fully described. This clamp has a socket 66 providing a bearing for receiving a laterally bent end 67 of a line 68 which link is secured adjacent its other end in a clamp 69 mounted on a pivot bolt 70 extending through it into one of the supporting posts 13, as shown in Fig. 1. The bearing or socket 66 is preferably provided with lubricating means in the form of a grease cup 71. Clamp 69 is shown provided with bolts 72 for securing link 68 in a longitudinally adjusted position therein. Link 68 holds the ratchet arm by means of the connecting clamps 64 and 69 so that movement of the turnbuckle device by the reciprocation of the rod line will cause the arm to swing with respect to the turnbuckle device.

In practice the pull rod line adjuster is preferably installed in the rod line adjacent to a well to which the rod line extends, and the link 68 is adjusted in its pivoted clamp 69 so that the ratchet arm 41 will be in a substantially vertical position when the turnbuckle device is in a mean position between the ends of its normal reciprocatory strokes. Clamp 64 is secured to ratchet arm in a position corresponding to the length of the normal stroke of the rod line and trip members 56 and 57 are adjusted in slots 59 and 60 so that they will engage the respective ratchet cams 49ª and 50ª at the ends of the normal strokes without tilting the pawl 47 from its "neutral" position.

In operation the pull rod line is normally reciprocated through strokes of predetermined length at the power plant and thereby reciprocates the turnbuckle device or coupling which is supported by means of extending tubes 17 and 18 of the carriage sliding in the apertures in posts 13 and 14 and causes the ratchet arm 41 to swing with respect to the coupling. So long as there is no change in temperature to disturb the normal mean position of the reciprocation limits of the turnbuckle device for which the various parts were originally adjusted, the turnbuckle device is not actuated and remains idle as it is reciprocated with the rod line. In the event that the rod line should be expanded or contracted by changes in temperature, however, the ratchet pawl 47 will be thrown into engagement with the ratchet wheel 39 at one end of the reciprocating stroke or the other as a result of the bodily shift of the turnbuckle device reciprocation limits through the resultant change in length of the rod line.

Assuming that the rod line is expanding due to an increase in temperature and that this shifts the reciprocation limits toward the left (Figures 1 and 2), the path of movement of the turnbuckle device will be advanced with respect to the link connection for the ratchet arm 41 and thus cause the ratchet arm to have a greater swing to the right with respect to the turnbuckle members and in consequence, at the end of the stroke toward the left of the turnbuckle device, trip member 57 will engage the ratchet cam 50ª, rocking the pawl from the neutral position and force pawl tooth 49 into engagement with a tooth 51 of ratchet wheel 39 so as to turn it in a clockwise direction during the reverse stroke, toward the right, of the rod line and turnbuckle device, thereby turning the nut 23 in a clockwise direction, as viewed from the left in Figure 3, on the screw 22 so as to contract the length of the rod line. Upon the return stroke (to the left), the gear 38 will be held against turning by brake 63 acting with sufficient friction on gear 38 to throw the pawl tooth out of engagement with the ratchet wheel until trip member 57 acts again on ratchet cam 50ª to effect an engagement of pawl tooth 49 with a tooth 51 of the ratchet wheel. During the following stroke the pawl rotates the ratchet wheel again and this operation is repeated until the rod line ceases to expand and is adjusted to the proper length. The trip members 56 and 57 are so adjusted in their slots 59 and 60 that, when the rod line adjustment is reached, ratchet cam 49ª will engage trip member 56 at the extreme end of the stroke to the left and again restore pawl 47 to "neutral" position with its projection 54 in engagement with spring bolt 53 until another adjustment is to be effected.

When the temperature decreases and a contraction of the rod line occurs, trip member 56 will operate on cam 49ª to rock the pawl from neutral position and force pawl tooth 50 into engagement with a tooth 51 of ratchet wheel 39 for rotating the ratchet wheel in a similar manner in the opposite direction, and thus during variations in temperature the length of the rod line will be maintained substantially constant thereby preventing such change in length of the rod line as would interfere with the normal operation of the pumping machinery or cause injury thereto.

In the event that the position of the rod line adjuster is to be shifted toward the well or away therefrom for any reason, as for example a shortening or lengthening of the connection between the rod line and pump, the position of link 68 may be shifted in its clamp 70 to compensate for the change without having to change the stroke adjustments. The adjuster can be changed for different length strokes of the rod line by raising or lowering clamp 64 along the ratchet arm 41 without affecting the mean position of the stroke in the event that it is desired to change the length of the stroke of the rod line, and further changes in the length of the stroke of the rod line may also be compensated for by adjusting the trip members 56 and 57 in their slots 59 and 60. The various adjustments add to the flexibility of the rod line adjuster and facilitate the installation thereof as well as in making changes therein as may be necessary from time to time.

The embodiments hereinbefore described afford a simple and practical means for effecting the length adjustment of pull rod lines for oil well pumping systems for maintaining their proper length irrespective of temperature changes and providing means for quickly changing the stroke length settings of the adjuster to take care of longer or shorter strokes of the rod line as well as for shifting the adjuster to provide for increasing or decreasing the length of the rod line by constant amounts as may be necessary in changing connections between the rod line and pumping machinery from time to time. It is to be understood, of course, that the principles of invention may be applied to power-transmitting members wherever length compensation due to temperature changes is necessary and the broad scope both as regards to applicability and mechanical form may vary widely from the specific organization herein shown and described.

What is claimed is:

1. The combination, with a reciprocatory power transmitting rod line consisting of a plurality of sections, of a coupling member between sections of the rod line reciprocatory therewith and adjustable to change the length of the rod, a fixed support, and a continuous connection between said support and the coupling member, said connection being provided with means operable upon the coupling member at either end of its reciprocatory stroke to change the relation of the rod line sections to each other to compensate for variations in the length of the line.

2. The combination, with a reciprocatory power transmitting rod line consisting of a plurality of sections, of a coupling member between sections of the rod line reciprocatory therewith and adjustable to change the length of the rod, a fixed support, a connection between said support and the coupling member operable upon the coupling member to change the relation of the rod line sections to each other to compensate for variations in the length of the line, and means for varying said connection for effecting the adjustment of the coupling for increased or decreased lengths of reciprocatory strokes of the rod line.

3. The combination, with a reciprocatory power transmitting rod line consisting of a plurality of sections, of a coupling member between sections of the rod line reciprocatory therewith and adjustable to change the length of the rod, a fixed support, a connection between said support and the coupling member operable upon the coupling member to change the relation of the rod line sections to each other to compensate for variations in the length of the line, and means for adjusting said connection for shifting the position of the reciprocatory strokes of the coupling member longitudinally of the path of movement of the rod line.

4. The combination, with a reciprocatory power transmitting rod line consisting of a plurality of sections, of a coupling member between sections of the rod line reciprocatory therewith and adjustable to change the length of the rod line, and means adapted upon change in the line length to cooperate with the coupling member at either end of its reciprocatory stroke for automatically adjusting the length of the line during the following return stroke.

5. In apparatus of the character described, the combination with a power plant, a power translating device, and a reciprocatory rod line operatively connecting the two, of a turnbuckle device adjustably coupling two sections of said rod line and reciprocable therewith, and actuating means carried by the turnbuckle device and cooperating therewith when the turnbuckle device has moved in either direction beyond the normal limits of its stroke to effect a compensating adjustment of the rod line to maintain the turnbuckle device within the normal limits of its stroke.

6. An adjuster for a reciprocatory power-transmitting rod line including a plurality of rod sections comprising, in combination, a turnbuckle device for connection between sections of the rod line to be reciprocated thereby, said turnbuckle device including a screw for connection with one section of the rod and a rotatable nut and means for connecting the same with an adjoining section of rod rotatable driving means carried by the turnbuckle device for turning the rotatable nut on the screw, and actuating means swingingly mounted on the turnbuckle device carrying means for engaging said rotatable means at either end of the reciprocatory movement of the turnbuckle device and operable to turn said rotatable member for changing the position of the nut on the screw and thereby adjust the length of the line.

7. An adjuster for a reciprocatory power-transmitting rod line including a plurality of rod sections comprising, in combination, a turnbuckle device for connection between sections of the rod line to be reciprocated thereby, said turnbuckle device including a screw for connection with one section of the rod and a rotatable nut and means for connecting the same with an adjoining section of rod, rotatable driving means carried by the turnbuckle device for turning the rotatable nut on the screw, actuating means swingingly mounted on the turnbuckle device carrying means for engaging said rotatable means at either end of the reciprocatory movement of the turnbuckle device and operable to turn said rotatable member for turning the nut on the screw during the following reverse stroke thereof, a fixed support, and a connection between said swinging actuating means and said fixed support operable to effect the swinging relation of the actuating member with relation to the turnbuckle.

8. An adjuster for a reciprocatory power-transmitting rod line including a reciprocatory carriage, a screw supported thereby and movable longitudinally thereof, a nut threaded on said screw and rotatably supported in said carriage, said screw and nut adapted respectively for connection to rod line sections to be adjustably coupled thereby, rotatable driving means mounted on the carriage for turning said nut on said screw, a swinging actuating member mounted on the carriage, means for effecting the swinging relation of the actuating member with respect to the carriage, a pawl member on said actuating member for engaging said rotatable member, and means mounted on the carriage effective to move the pawl member into engagement with the rotatable member at either end of the reciprocatory movement of the carriage for turning said rotatable means to adjust the nut along the screw.

9. An adjuster for a reciprocatory power-transmitting rod line including a carriage, supporting means on which said carriage reciprocates, a screw supported by the carriage and movable longitudinally thereof, a nut threaded on said screw and rotatably supported in said carriage, operating means mounted on the carriage for turning said nut on said screw including a ratchet wheel having its shaft extending transversely of the screw, a swinging actuator member pivotally mounted on the carriage, a link connection between said supporting means and said actuating member for effecting the swinging relation of the actuating member with respect to the carriage, a pawl member mounted on the swinging actuator member for engaging the ratchet wheel to rotate it in either direction, and means mounted on the carriage effective to move the pawl member into engagement with the ratchet wheel at either end of the reciprocatory movement of the carriage for turning said ratchet wheel to adjust the nut along the screw whereby the position of the nut screw is changed along the screw in the event that the limits of the reciprocatory movement of the carriage is shifted beyond the limits of its normal stroke.

10. An adjuster according to claim 10 including a quadrant mounted on the carriage adjacent to the swinging actuator member, said quadrant having a pair of arcuate slots one on either side of the actuator member, and a trip member adjustably mounted in each of said slots for cooperating with the pawl member carried by the actuator member for effecting its engagement with the ratchet wheel in the event that the adjuster is reciprocated beyond either end of its normal reciprocatory stroke.

11. The combination with a reciprocatory power-transmitting rod line, one end of which is for connection with a power plant and the other end with a power-translating device, of a rod line adjuster operative to keep the stroke at the power translating device end of the rod line within certain limits, and means for shifting the position of the adjuster corresponding to a forward or backward advancement required for the connection with the power translating device without varying the adjustment for strokes within certain limits.

12. The combination with a reciprocatory power-transmitting rod line, one end of which is for connection with a power plant and the other end with a power-translating device, of a rod line adjuster operative to keep the stroke at the power translating device end of the rod line within certain limits, and means for changing the adjuster for an increased or decreased length of stroke.

13. The combination with a reciprocating power transmitting member, one end of which is for connection with a power plant and the other with a power-translating device, of means operative to prevent the strokes at the power-translating device end of the member from advancing forwardly or rearwardly beyond predetermined limits, and means for adjusting said means to provide for strokes of increased or decreased length.

14. The combination with a reciprocatory power transmitting member, one end of which is for connection with a power plant and the other with a power-translating device, of coupling means operative to prevent the strokes at the power-translating device end of the member from advancing forwardly or rearwardly beyond predetermined limits, and means for adjusting said coupling means to provide for shifting the limits longitudinally of the power transmitting member without increasing or decreasing the stroke from said predetermined limits.

In testimony whereof I hereunto affix my signature.

JOSEPH L. KILCHENSTEIN.